United States Patent
Edwards et al.

(10) Patent No.: US 7,188,367 B1
(45) Date of Patent: Mar. 6, 2007

(54) VIRUS SCANNING PRIORITIZATION USING PRE-PROCESSOR CHECKING

(75) Inventors: Jonathan Edwards, Hillsboro, OR (US); Edmund White, Beaverton, OR (US); Shawna Turner, Portland, OR (US)

(73) Assignee: MoAfee, Inc., Santa Clara, CA (US)

( * ) Notice: Subject to any disclaimer, the term of this patent is extended or adjusted under 35 U.S.C. 154(b) by 1228 days.

(21) Appl. No.: 09/823,438

(22) Filed: Mar. 30, 2001

(51) Int. Cl.
G06F 12/14 (2006.01)
G08B 23/00 (2006.01)

(52) U.S. Cl. .................. 726/24; 713/188; 709/207; 718/103

(58) Field of Classification Search ............ 713/200, 713/188; 709/207; 718/103; 726/24
See application file for complete search history.

(56) References Cited

U.S. PATENT DOCUMENTS

| | | | | |
|---|---|---|---|---|
| 5,974,465 | A * | 10/1999 | Wong | 709/234 |
| 6,532,213 | B1 * | 3/2003 | Chiussi et al. | 370/230.1 |
| 6,560,632 | B1 * | 5/2003 | Chess et al. | 709/201 |
| 6,802,012 | B1 * | 10/2004 | Smithson et al. | 726/24 |
| 6,971,023 | B1 * | 11/2005 | Makinson et al. | 713/193 |

OTHER PUBLICATIONS

Interface Queue Management, Cisco, Aug. 3, 1995, <http://www.cisco.com/warp/public/614/16.html>, pp. 1-12.*

McAfee Virus Scan for Windows 3.x, University of East Anglia 1997, <http://www.uea.ac.uk/itcs/docs/d31w31.pdf> pp. 1-13.*

"Chapter Thirteen Performance Tuning," Aug. 1, 2000, pp. 1-5. <http://www.mtsac.edu/~vzamora/cis19/chap13.htm>.*

"Using NetWare 3.12," Nov. 30, 2000, pp. 1-43. <http://www.et.utt.ro/public/Docs/Special%20Edition%20Using%20Netware%203.12/ch18.html>.*

"Reserved-Checkout for Versioned Object," IBM Technical Disclosure Bulletin, Mar. 1993, pp. 1-3.*

Microsoft Press Computer Dictionary Second Edition, 1994, p. 326.*

U.S. Appl. No. 09/586,265, filed May 31, 2000, Edwards et al.

* cited by examiner

*Primary Examiner*—Emmanuel L. Moise
*Assistant Examiner*—Michael Pyzocha
(74) *Attorney, Agent, or Firm*—Zilka-Kotab, PC; Christopher J. Hamaty

(57) ABSTRACT

A virus scanner is provided in which a pool of pre-processor threads and a queue are interposed between the event filter and the pool of scanner threads. The pre-processor threads perform operations that can be completed quickly to determine whether an object of a scan request needs to be scanned. The pre-processor threads gather characteristics about the scan requests and place them in the queue in a priority order based on those characteristics. The scanner threads select a scan request from the queue based on the priority order. Alternatively, the scan request is selected based on the scan request's characteristics as compared to the characteristics of the scan requests whose objects are currently being scanned by other scanner threads in the pool.

41 Claims, 6 Drawing Sheets

VIRUS SCANNING PRIORITIZATION USING PRE-PROCESSOR CHECKING

FIELD OF THE INVENTION

The invention generally relates to scanning data for presence of certain characteristics, such as virus code, and more particularly to prioritizing requests for scanning data using pre-processor checking.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, Network Associates Inc., All Rights Reserved.

BACKGROUND

With the advent of general access computer networks, such as the Internet, people may now easily exchange application programs and application data between computer systems. Unfortunately, some people have taken advantage of such easy data exchange by developing computer "viruses" designed to spread among and sometimes attack interconnected devices, such as networked computers. A virus is application code that executes on one's computer without one's knowledge, and against one's interests. Viruses tend to replicate themselves within all interconnected devices, allowing an exponential "infection" of other devices.

In response to the security threat intrinsic to viruses, anti-virus programs were developed to identify and remove viruses. Anti-virus programs periodically check a computer system for known viruses, or application code that appears to perform undesired activities, such as reformatting a hard disk. Virus scanners may be invoked on-demand by a computer user to scan a selected file. More typically, virus scanners install themselves as part of an operating system, and then scan files, according to user preferences, as the files are created and accessed. This type of virus scanner is referred to as an on-access virus scanner.

Some on-access virus scanners attach themselves to communication input and/or output pathways to inspect data that might not be easily identifiable to an operating system's file based scanning. For example, an e-mail scanner may be attached to a communication port, such as an e-mail transfer port so as to allow scanning of incoming and outgoing e-mails and their attachments. E-mail is a common way for a virus to enter into a system otherwise protected by an operating system based on-access scanner, as the e-mail program may receive and store an infected e-mail message without providing an opportunity to the operating system scanner to scan the e-mail. For example, an infected e-mail may be received and stored in a database such that there is no individual data, or recognizable data, available for scanning. Thus, an e-mail scanner is used to scan e-mails, and their attachments, as they are received (or sent) by a system.

A problem in using on-access virus scanners is that the scanned file, e-mail or e-mail attachment can be any type of data. For example in the case of e-mail, in order to reduce the size of the data transferred, the attachments are frequently compressed and stored as archives. The term archive as used herein includes traditional archive data formats such as ZIP, ZOO, LHA, ARC, JAR, LZW, etc. that contain compressed collections of data files, in addition to other data formats that may embed other files, e.g., Microsoft Word (e.g., ".DOC") documents, Rich Text Format (RTF) files, Object Linking and Embedding (OLE) containers, etc. Scanning archives and documents containing embedded objects takes additional time and resources to scan.

A prior art on-access virus scanner 100 is organized into two parts, as illustrated in FIG. 1. One part is the event filter 110, which is the software that intercepts the events of interest to the virus scanner. Events of interest include a file being opened or an e-mail arriving in a mailbox. Another part is a scanner thread 120, which is the software that receives scan requests from the filter. The scanner thread determines whether the object of the intercepted event (i.e. the file, e-mail, or e-mail attachment) needs scanning and, if so, scans the object. Multiple scanner threads are typically provided in pools 130 that are capable of executing concurrently so that multiple objects may be scanned simultaneously.

Unfortunately, virus developers have recently begun to manufacture "malicious" files which take "a long time" to scan, including archives and documents containing embedded objects. The malicious files are designed to overwhelm on-access virus scanners by tying up all of the available scanner threads in the pool, thereby causing all other events intercepted by the filter to be queued until a scanner thread becomes free. This causes the virus scanner to "crash" by blocking further processing of data and leaves a system undefended against subsequent attacks. If e-mail or file processing is routed through a virus scanner and the scanner has crashed, then a "denial of service" for e-mail or file activity occurs until the scanner is restarted.

In some instances, a computer user may inadvertently overwhelm a virus scanner by repeatedly accessing a file that is taking a long time to scan, which only increases the burden on the virus scanner. For example, if a particular ZIP file takes 10 minutes to scan and a user deliberately or accidentally accesses that file several times, then all the on-access virus scanner's scanner threads will be scanning the ZIP file. Since no other file accesses can be processed for 10 minutes, the user's computer is effectively unusable for that period of time.

Even if a particular file takes just 5 seconds to scan but is being accessed frequently, then the scanner thread pool may still be overwhelmed causing other file accesses to be delayed by several seconds. While this doesn't affect the availability of the computer as much as the ZIP file that takes 10 minutes to scan, the "user experience" is still poor, i.e. their applications are unresponsive. If the user clicks on a document and the system doesn't respond within a short enough time then the user may very well click again and again, which only makes the problem worse.

One remedy might be to simply increase the number of scanner threads in the pool. However, this may not be achievable given the practical limits on processor power. Moreover, an increase in the number of scanner threads is likely to be inadequate, particularly when the virus scanner is overwhelmed as the result of a malicious attack. What is needed, therefore, is an improved method of virus scanning that improves the efficiency with which scanner threads process scan requests.

SUMMARY OF THE INVENTION

The above-mentioned shortcomings, disadvantages and problems are addressed by the present invention, which will be understood by reading and studying the following specification.

A pool of pre-processor threads and a priority queue are interposed between the event filter and the pool of scanner threads. The pre-processor threads receive the scan requests from the event filter and perform operations that can be completed quickly. One operation is to determine whether the object needs to be scanned at all based on characteristics of the scan request. If the file does not need scanning then the event that triggered the scan request (e.g. a file access) is completed without any further processing by the scanner threads. If the file does need scanning then the pre-processor thread gathers additional characteristics about the scan request before placing it in the priority queue.

In one aspect, the scan requests are placed on the priority queue as they are received; the scanner threads can then select a suitable scan request from the priority queue based on the scan request's characteristics and the current state of the other scanner threads in the pool. In an alternative aspect, the scan requests are placed on the priority queue in a priority order; the scanner threads then select the next scan request from the priority queue in priority order. The priority order is based on the scan request's characteristics and may be determined by the event filter or a separate scan prioritizer component of the virus scanner having access to the scan request's characteristics.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

Features and advantages of the invention will become apparent to one skilled in the art to which the invention pertains from a review of the following detailed description and claimed embodiments of the invention in conjunction with the drawings, and in which:

DETAILED DESCRIPTION

Figure 1:
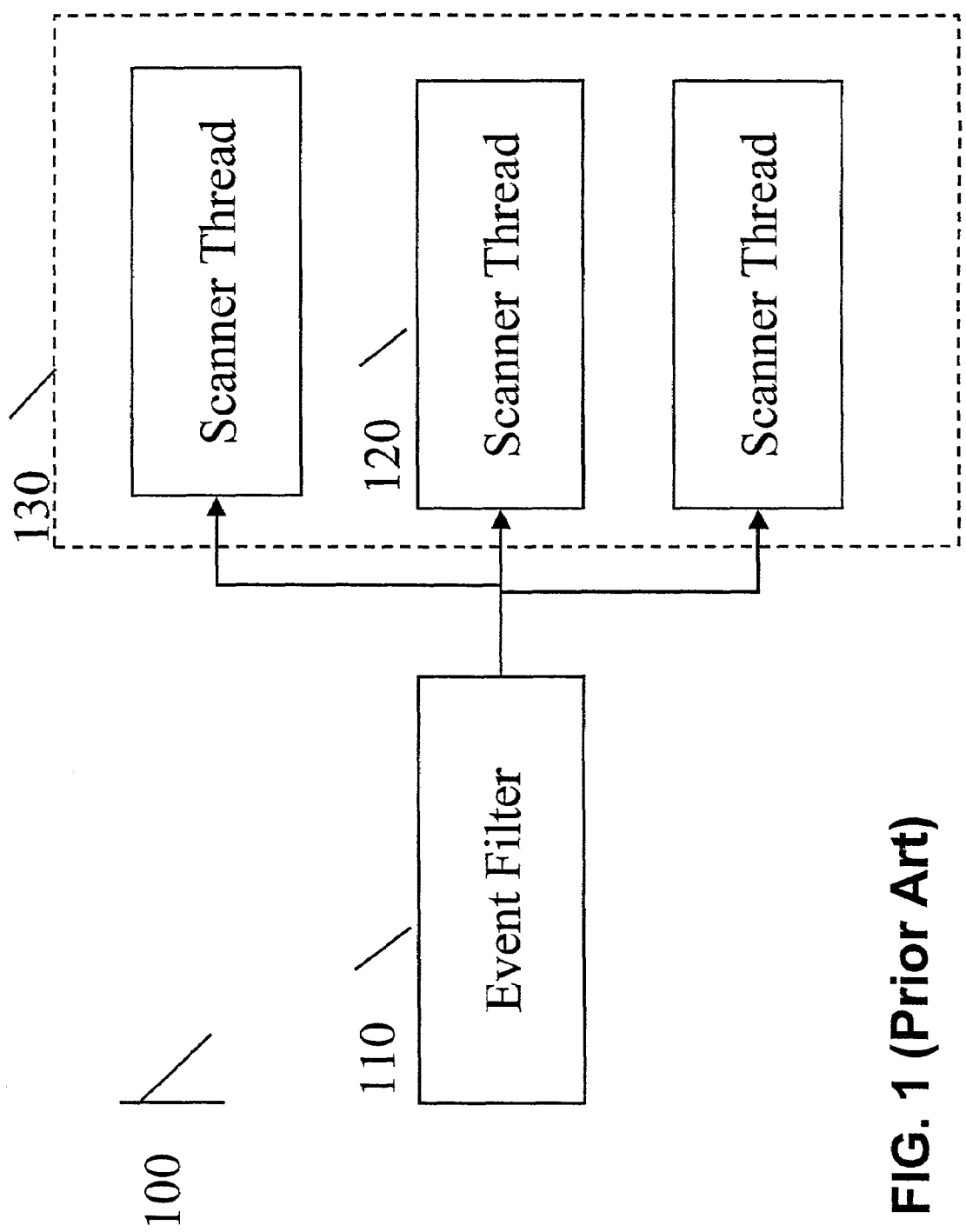
FIG. 1 is a block diagram illustrating a simplified overview of a prior art virus scanner.

In the following description various aspects of the present invention, a method and apparatus for virus scanning prioritization using pre-processor checking, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention.

Parts of the description will be presented using terminology commonly employed by those skilled in the art to convey the substance of their work to others skilled in the art, including terms of operations performed by a computer system or virus scanner, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

A virus scanner must be capable of quickly detecting and disposing of malicious files, emails, archives, or other objects that may be infected with a virus. Otherwise, accessing the malicious object can result in the temporary or even prolonged disablement or stalling of all virus scanning and/or file activity of the scanner's host system. When the virus scanner is disabled, the user is vulnerable to subsequent viral attacks. In the case of on-access scanners, including e-mail scanners, the virus scanner may be integrated into the operating system in such a manner that the disablement of the virus scanner causes the entire system to become unresponsive or appear to hang.

One of the ways in which a virus scanner becomes disabled is when all of the virus scanner's threads are scanning objects that take a long time to scan, or when a sudden large volume of scan requests are received from one or more sources. Either way, the virus scanner becomes overwhelmed and usually crashes.

A scanner thread processes the object of a scan request by scanning it for the presence of known viruses. A virus scanner contains multiple scanner threads organized into pools. A scan request is generated whenever an event occurs that causes the host system to access an object, such as opening a file, reading an e-mail, or opening an e-mail attachment. In a typical prior art virus scanner, the scan requests are queued in the order in which they were generated, and processed by the scanner threads as the threads become available to scan new objects for viruses, i.e. first in, first out (FIFO).

Figure 2:
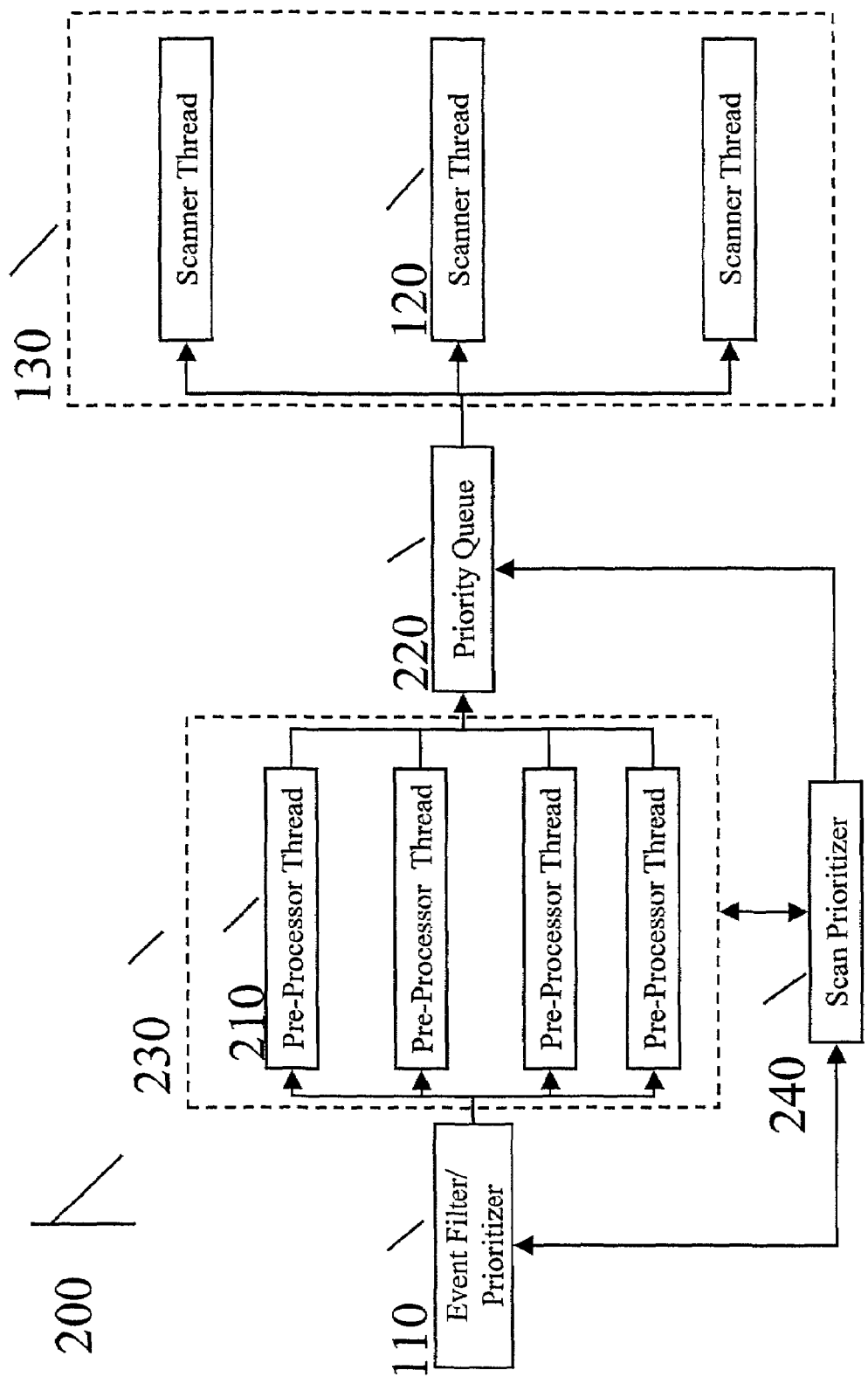
FIG. 2 is a block diagram illustrating one generalized embodiment of a virus scanner incorporating the invention.

FIG. 2 illustrates a block diagram overview of one embodiment of a virus scanner 200 incorporating the method of the present invention to prioritize scan requests using pre-processor checking. By prioritizing the scan requests, the virus scanner 200 is less vulnerable to attack upon accessing malicious objects and performance efficiency is improved. As illustrated, a pre-processor pool 230 of four pre-processor threads 210 and a priority queue 220 are interposed between the event filter 110 and the scanner thread pool 130 of three scanner threads 120. Although illustrated with four pre-processor threads 210, the pre-processor pool 230 may be composed of any number of pre-processor threads 210 without departing from the principles of the invention. Similarly, although illustrated with three scanner threads 120, the scanner thread pool 130 may be composed of any number of scanner threads 120 without departing from the principles of the invention. The pre-processor threads 210 perform one or more quick checks on the scan request before passing the request to the scanner threads 120 for scanning. Quick checks are operations that can always be completed quickly. This includes checking whether the object needs to be scanned and, if so, obtaining certain additional characteristics about the scan request.

In one embodiment, whether the object needs to be scanned is determined by whether the object is in a directory that has been excluded from all virus-scanning operations. Alternatively, whether the object needs to be scanned is determined by whether the object is associated with an anti-virus status such as an anti-virus signature. The anti-virus status may be stored with the object and may include the date stamp and status of previously performed virus scans. The anti-virus status enables the pre-processor thread 210 to determine whether the object has been scanned recently and whether the object is known to be infected.

In one embodiment, the pre-processor threads 210 obtain certain additional characteristics about the scan requests. The characteristics may include but are not limited to the identity and type of process that is accessing the object (e.g. the Microsoft Windows applications explorer.exe, or winword.exe), the name, status or other characteristics of the user that is causing the object to be accessed (e.g. an administrative vs. a non-administrative user), the file extension of the object being accessed (e.g. executable type .dll and .exe files vs. data type .doc files) and the time that the scan request for the object was initiated. In a client/server environment, the characteristics may further include whether the object is being accessed from the server console or from a network client.

In one embodiment, the characteristics obtained by the pre-processor threads 210 are used by the event filter 110 to prioritize the scan requests by placing them in the priority queue 220 in the order in which the scanner threads 120 should process them. In one embodiment the event filter 110 determines the scanning order using a scan prioritizer 240 that has access to the scan requests and their associated object's characteristics as obtained by the pre-processor threads 210. In an alternate embodiment, the scan requests are placed in the priority queue 220 in the order in which they were intercepted by the event filter 110. In this case, the scanner thread 120 selects the most suitable of the pending scan requests to process from the priority queue 220. The most suitable of the pending scan requests is determined from the characteristics of the pending scan requests on the priority queue 220 as compared to the characteristics of the scan requests currently being processed as well as from the current activity of the other scanner threads 120 in the scanner thread pool 130.

Because there is more information about the scan requests available after pre-processing (i.e. the scan request characteristics), there are numerous ways for the event filter 110 to place scan requests on the priority queue 220 in the optimal priority order using the scan prioritizer 240, or for the scanner threads 120 to select the most suitable pending scan request from the priority queue 220.

For example, using the scan request's user characteristics, a pending scan request from user A may be determined to be more suitable than a pending scan request from user B if three of the four scanner threads are already scanning scan requests from user B. This prevents a single user B from monopolizing the virus scanner 200. On the other hand, if user B is an administrator with a higher level of authority than user A, the pending scan request from user B may trump that of user A. If there was a problem with the system server, this might give the administrator a better chance of starting the diagnostics software needed to troubleshoot and solve the problem.

As another example, using the scan request's process type characteristics, files being accessed by operating system processes could be given higher priority than files being accessed by users' applications. The scanner threads 120 would process scan requests for objects being accessed by the operating system before those for objects being accessed by normal applications.

As another example, using the scan request's object type characteristics, executable files with .dll or .exe extensions could be given higher priority than data files with .doc or .xls extensions, since in some server environments it might be determined that ensuring quick access to executable files increases the usability of the system.

As another example, using the scan request's operational characteristics, such as a time stamp of when the scan request was triggered by the event filter 110 or when it was placed on the priority queue 220, scan requests that have been passed over too often (i.e. that have been on the priority queue 220 the longest) could eventually be given higher priority than scan requests that would otherwise come first. This avoids the situation where an object is never scanned because there is always a more attractive scan request in the priority queue 220.

In one embodiment, the priority of one characteristic over another is fixed (e.g. requests to scan executable files .exe always supersede requests to scan data files .doc). In an alternate embodiment, the priority may also be parameterized to allow an administrator to work out the optimal priorities of scan request characteristics for certain operating environments (e.g. allowing certain requests originating on network clients to supersede certain requests originating on servers).

In each of the above examples, the scanner threads 120 process scan requests either by selecting the most suitable pending request, or by selecting the next pending request that was placed on the priority queue in the optimal priority order by the scan prioritizer 240.

Figure 3:
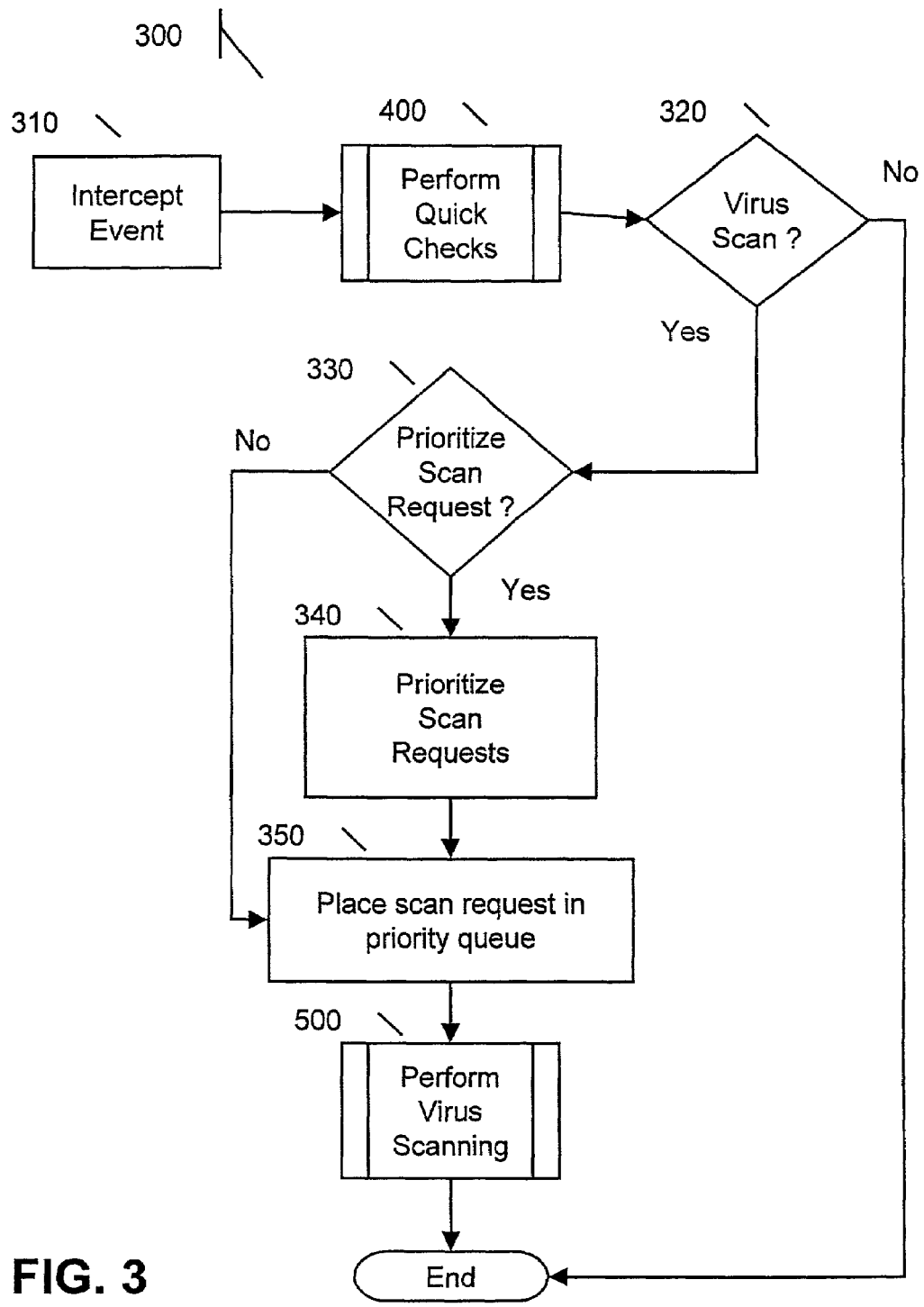
FIG. 3 is a flow diagram illustrating a method to be performed by a computer executing one embodiment of the virus scanner shown in FIG. 2.
Figure 4:
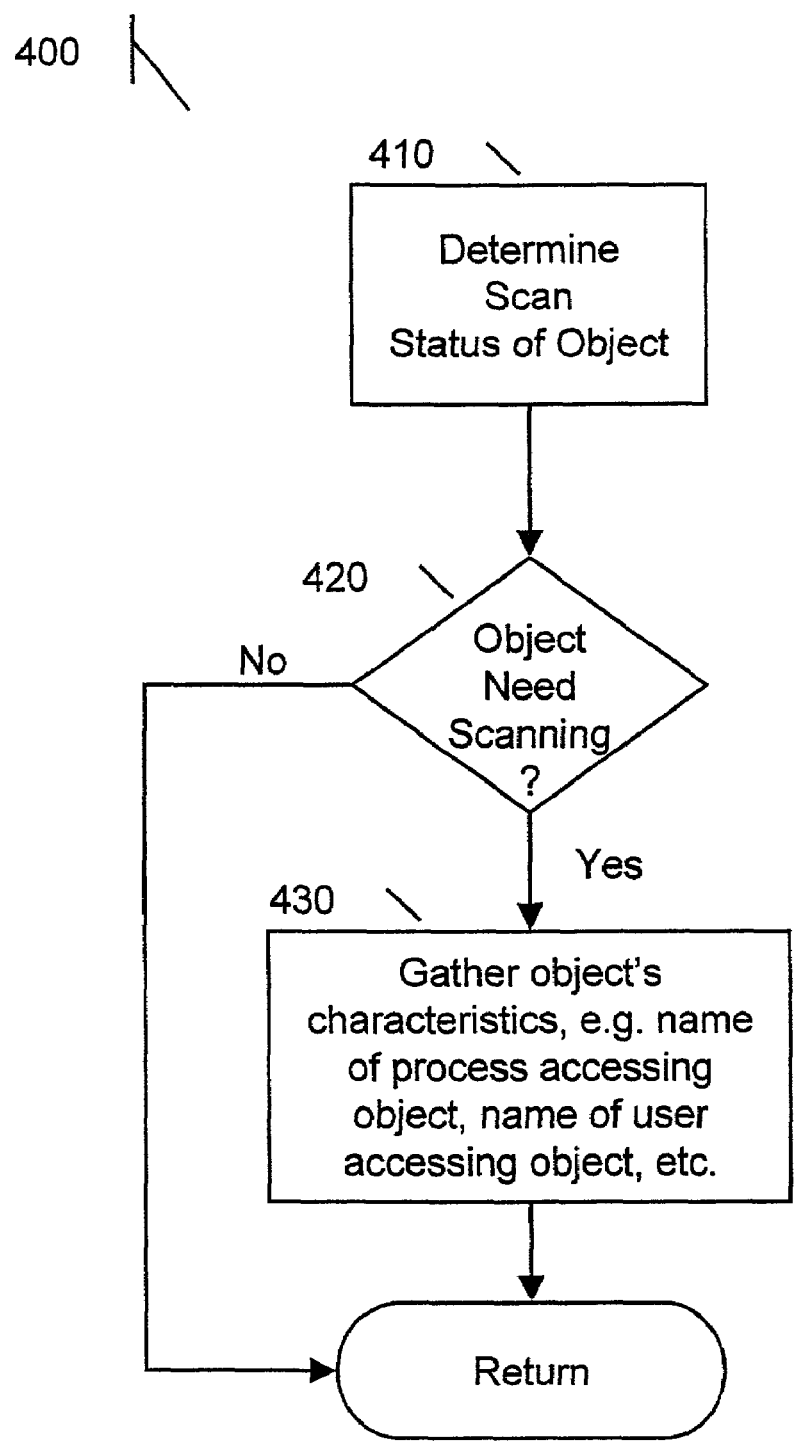
FIG. 4 is a flow diagram illustrating in further detail a pre-processor quick check method performed by a computer executing the virus scanning method shown in FIG. 3.
Figure 5:
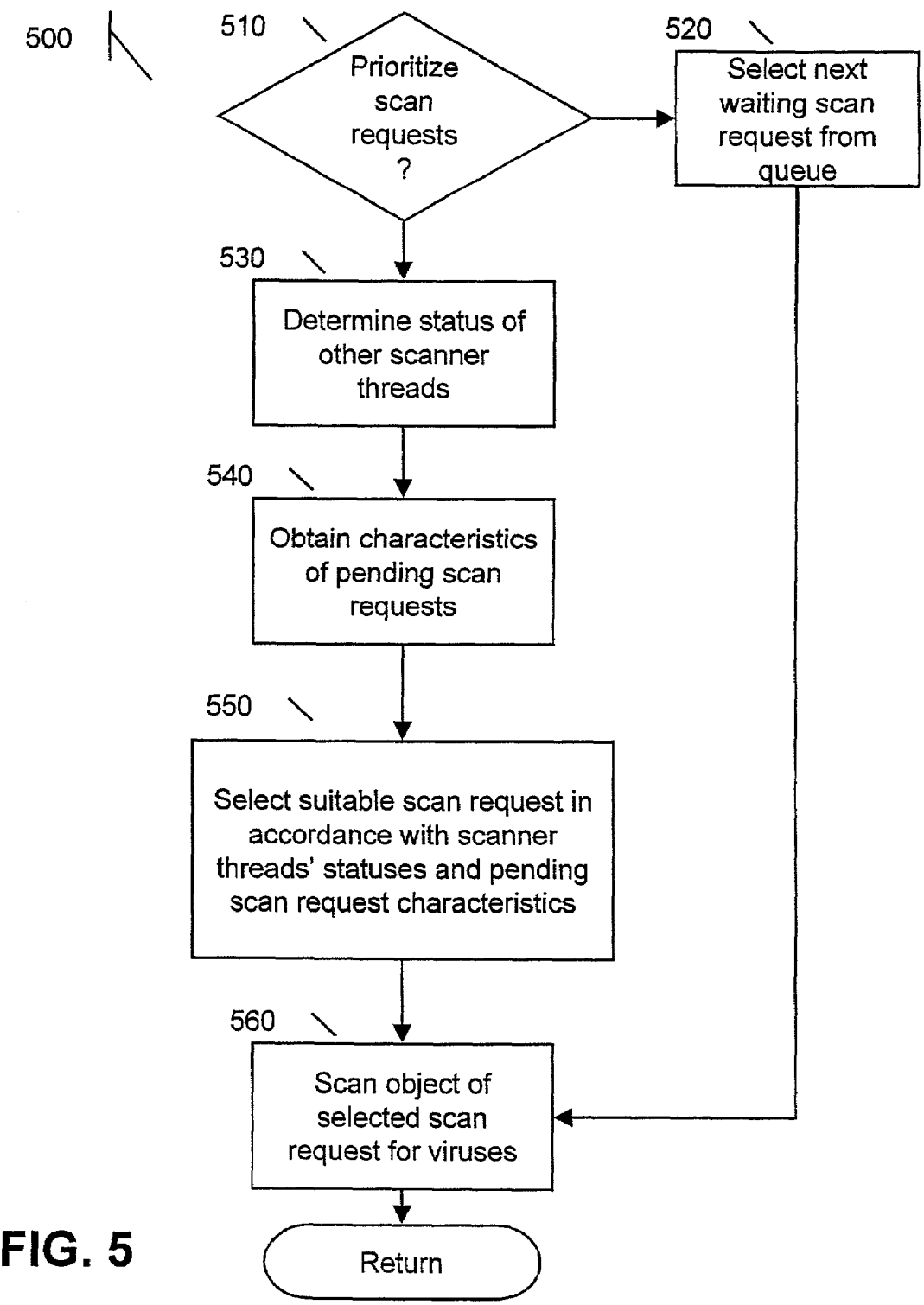
FIG. 5 is a flow diagram illustrating in further detail a virus scan selection method performed by a computer executing the virus scanning method shown in FIG. 3.

Turning now to FIGS. 3–5, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

Referring to FIG. 3, the acts to be performed by a computer executing a virus scanning method 300 that incorporates one embodiment of the invention are shown. FIGS. 4–5 illustrate certain processes performed by the methods 400 and 500 in more detail.

When the virus scanning method 300 is executed, a user or any process on the host computer that accesses an object causes an event to be triggered and intercepted 310 by the event filter 110. The virus scanning method 300 generates a scan request for the object that triggered the event. Instead of placing the scan request in a scan queue, the virus scanning method 300 performs a quick checks pre-processor 400 on the scan request as described below with reference to FIG. 4. If the object of the scan request needs to be scanned 320, then the virus scanning method 300 determines whether or not to prioritize the scan request 330 before placing it 350 on the priority queue 220 in accordance with the pre-defined system configuration. In one embodiment, if the scan request should be prioritized, then the scan prioritizer 240 prioritizes the scan requests in accordance with the scan request characteristics obtained in the quick checks process 400 and places it 350 on the priority queue 220. The rules for prioritizing the scan requests in accordance with the scan request characteristics may vary from one implementation to the next and may be configured by an administrator for optimal virus scanner throughput. In an alternate embodiment, the scan request is placed on the priority queue 220 in the order it was received or some other pre-defined fixed order, e.g. executable files first and data files second, in their respective time-stamp order. The virus scanning method 300 then proceeds to perform virus scanning 500 described below with reference to FIG. 5.

Referring to FIG. 4, the acts to be performed by a computer executing a quick checks pre-processor 400 that incorporates one embodiment of the invention are shown. The scan status of the object of the scan request is determined 410 by one of the quick checks pre-processor threads 210. For example, the pre-processor thread 210 may determine the object's scan status by inspecting an anti-virus status of the object of the scan request, such as an anti-virus signature, or by inspecting whether the object is in a directory that has been excluded from all virus-scanning operations. If the status of the object indicates that the object needs scanning 420, then the quick checks pre-processor thread 210 proceeds to gather characteristics about the scan request itself and additional characteristics (other than the scan status) about the object of the scan request, e.g. name of the process accessing the object, name of the user accessing the object, the file extension of the object, etc. 430, before returning to the virus scanning method 300. If the object does not need scanning than the pre-processor thread 210 terminates the scan request and the quick checks method 400 releases the object to the user or process that initiated the event.

Referring to FIG. 5, the acts to be performed by a computer executing a virus scanner prioritization method 500 that incorporates one embodiment of the invention are shown. The next available scanner thread 210 determines whether it needs to prioritize the pending scan requests 510, or whether it can select the next pending scan request 520 from the priority queue 220 (i.e. whether the scan request has already been prioritized by the scan prioritizer 240 or whether the most suitable scan request is to be selected). If the pending scan requests are to be prioritized, then the scanner thread 210 determines the status 530 of the other scanner threads 210 in the scanner thread pool 230. For example, three of the scanner threads 210 may be busy processing large archive files or they may be processing objects accessed by the same user. The scanner thread 210 inspects the characteristics of the pending scan requests 540 as obtained by the quick checks pre-processor method 400. Once the status of the other scanner threads and the characteristics of the pending scan requests are determined, the scanner thread 210 selects a suitable scan request from the priority queue 220. The rules for selecting a suitable scan request may vary from one implementation to the next and may be configured by an administrator for optimal virus scanner throughput. The scanner thread 210 scans the object of the selected scan request for the presence of viruses, cleaning the object as appropriate, and returning to the virus scanning method 300. In turn, the virus scanning method 300 releases the scanned/cleaned object to the user or process that initiated the event.

Figure 6:
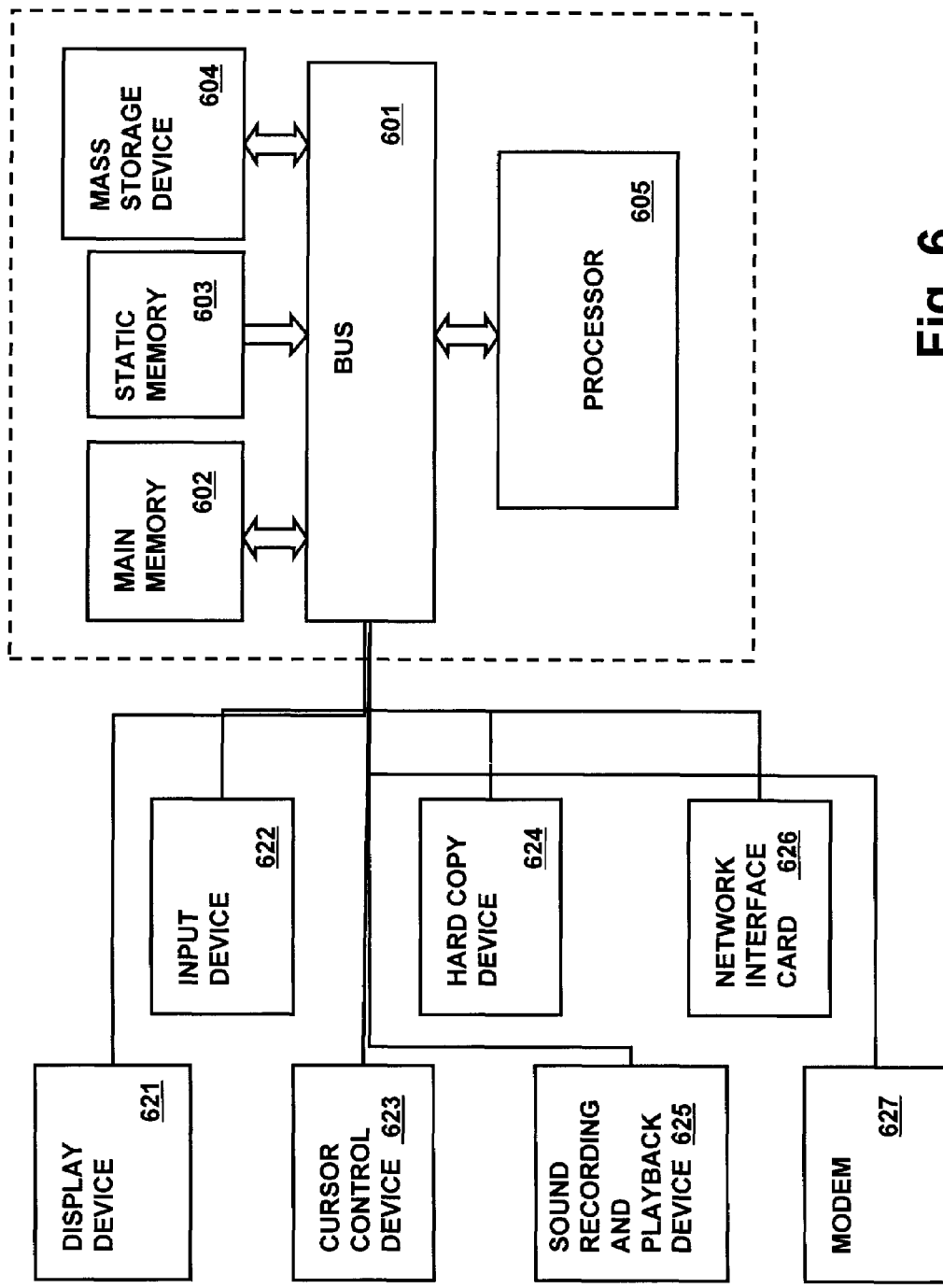
FIG. 6 illustrates a suitable computing environment in which certain aspects the illustrated invention may be practiced.

FIG. 6 and the following discussion are intended to provide a brief, general description of a suitable computing environment in which certain aspects of the illustrated invention may be implemented. The invention may be described by reference to different high-level program modules and/or low-level hardware contexts. Those skilled in the art will realize that program module references can be interchanged with low-level hardware instructions.

Program modules include procedures, functions, programs, components, data structures, and the like, that perform particular tasks or implement particular abstract data types. The modules may be incorporated into single and multi-processor computing systems, as well as hand-held devices and controllable consumer devices (e.g., Personal Digital Assistants (PDAs), cellular telephones, etc.). It is understood that modules may be implemented on a single computing device, or processed over a distributed network environment, where modules can be located in both local and remote memory storage devices. An exemplary system for implementing the invention includes a general-purpose computer system 600 comprising a bus 601, or other communications hardware and software, for communicating information, and a processor (or processing unit) 605 coupled with bus 601 for processing information. Computer system 600 further comprises a random access memory (RAM) or other dynamic storage device 602 (referred to as main memory), coupled to bus 601 for storing information and instructions to be executed by processor 605. Computer system 600 also comprises a read only memory (ROM) 603, and/or other static storage device, coupled to bus 601 for storing static information and instructions for processor 605. Mass storage device 604 is coupled to bus 601 for storing information and instructions.

Furthermore, mass storage device 604, such as a magnetic disk or optical disk or other machine-accessible medium, and its corresponding disk drive, can be coupled to computer system 600 for accessing the information and instructions stored thereon via bus 601. Computer system 600 can also be coupled via bus 601 to a display device 621 for displaying information to a computer user such as a network manager. Display device 621 is used to display a graphical user interface to the present invention. Display device 621 can include a frame buffer, specialized graphics rendering devices, a cathode ray tube (CRT), and/or flat panel display. An input device 622, including a device with alphanumeric and other keys, or a voice command input device capable of accepting audio input is typically coupled to a bus 601 for communicating information and command selections to processor 605. Another type of user input device is a cursor control device 623, such as a mouse, a trackball, a pen, a touch screen, or cursor direction keys for communicating direction information and command selections to processor 605, and for controlling cursor movement on display device 621. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom. Another device that may be coupled to bus 601 is a hard copy device 624 which may be used for printing instructions, data, or other information on a medium such as paper, film, or similar types of media. Additionally, computer system 600 can be coupled to a device for sound recording, and/or playback 625, such as an audio digitizer coupled to a microphone for recording information. Further, the device may include a speaker that is coupled to a digital to analog (D/A) converter for playing back the digitized sounds.

Network interface card 626 is coupled to bus 601. Network interface card 626 is further coupled to an external computer network (not shown). Network interface card 626, in conjunction with appropriate data communications protocols (e.g., the TCP/IP suite of internetworking protocols), provide the means by which an embodiment of the present invention operating on a general-purpose computer system 600 exchanges information with other devices coupled to the same computer network. Modem 627 is coupled to bus 601, and provides an alternate means of exchanging information with other devices for which a modem connection to an external computer network or device (not shown) can be established.

Computer system 600 and virus scanning software 200/300/400/500 stored and executed therein as part of the method and apparatus of the present invention operate in conjunction with an operating system with graphics capability, such as Microsoft's Windows or Windows CE operating systems. Commercially available computer systems implementing the features of general-purpose computer system 600 include a broad range of operating system-based computers, including server computers, desktop computers, workstations, personal digital assistants, devices, or other computer appliances. Furthermore, the present invention may be used in conjunction with various browsers (e.g. Microsoft Internet Explorer or Netscape Navigator) designed for both conventional and wireless web servers and various electronic mail applications (e.g. Microsoft Outlook, and Lotus Notes) or other messaging applications to yield an operational platform upon which an embodiment of the present invention may be implemented.

The storage systems and associated machine-accessible media provide storage of data and executable instructions for the computing device 600. Storage options include hard-drives, floppy-disks, optical storage, magnetic cassettes, tapes, flash memory cards, memory sticks, digital video disks, and the like, and may be connected to the bus 601 by way of an interface. Computing device 600 is expected to operate in a networked environment using logical connections to one or more remote computing devices through a network interface 626, modem 627, or other communication pathway. Computing devices may be interconnected by way of a network such as a local intranet or the Internet.

Having described and illustrated the principles of the invention with reference to illustrated embodiments, it will be recognized that the illustrated embodiments can be modified in arrangement and detail without departing from such principles. For example, while the foregoing description focused on on-access virus scanners, it will be recognized that the above techniques and analyses can be applied to scanning data in other contexts such as on-demand virus scanners having comparable limitations.

And, even though the foregoing discussion has focused on particular embodiments, it is understood that other configurations are contemplated. In particular, even though expressions such as "in one embodiment" and the like may be used herein, such phrases are meant to generally reference embodiment possibilities, and are not intended to limit the invention to particular embodiment configurations. As used herein, these phrases may reference the same or different embodiments, and unless expressly indicated otherwise, are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method for prioritizing virus scan requests comprising:
   checking a virus scan request to determine if scanning an object of the request is necessary; and
   placing the virus scan request on a queue in a priority order based on a characteristic of the virus scan request, the characteristic including at least one of an identity of the user triggering the virus scan request, a type of the process accessing the object, a time stamp of when the virus request was received, and an indication of a network node accessing the object, wherein the virus scan request is prioritized based on at least one of the user identity being an administrator as compared to a regular user, the process type being an operating system as compared to a user application, the time stamp being earlier than the time stamps of each scan request previously placed on the queue, and the indication being that the object is accessed from a server console as compared to a network client.

2. The method of claim 1, further comprising:
   selecting a one of the virus scan requests from the queue.

3. The method of claim 2, wherein selecting is based on the priority order.

4. The method of claim 2, wherein selecting is based on the characteristic of the virus scan request.

5. The method of claim 2, further comprising:
   scanning the object of the selected virus scan request.

6. The method of claim 1, wherein the priority order is further based on comparing the characteristic of the virus scan request with the characteristics of the virus scan requests previously placed on the queue.

7. The method of claim 6, wherein the priority order is further based on a parameter indicating which of the compared characteristics is given higher priority.

8. The method of claim 4, wherein selecting is further based on comparing the characteristics of the virus scan requests placed in the queue.

9. The method of claim 8, wherein selecting is further based on comparing the characteristics of the virus scan requests placed in the queue with the characteristics of the previously selected virus scan requests whose objects are currently being scanned.

10. The method of claim 9, wherein selecting is further based on a parameter indicating which of the compared characteristics is given higher priority.

11. The method of claim 1, wherein scanning is necessary when a virus scan status indicates the object is not known to be virus free.

12. The method of claim 1, wherein scanning is necessary when the object of the virus scan request is in a directory not excluded from virus scanning.

13. An apparatus comprising:
   a machine-accessible medium having stored thereon executable instructions to cause a computer to perform
   checking a virus scan request to determine if scanning is necessary; and
   placing the virus scan request on a queue in a priority order based on a characteristic of the virus scan request, the characteristic including at least one of an identity of the user triggering the virus scan request, a type of the process accessing the object, a time stamp of when the virus scan request was received, and an indication of a network node accessing the object, wherein the virus scan request is prioritized based on at least one of the user identity being an administrator as compared to a regular user, the process type being an operating system as compared to a user application, the time stamp being earlier than the time stamps of each scan request previously placed on the queue, and the indication being that the object is accessed from a server console as compared to a network client.

14. The apparatus of claim 13, further comprising instructions for selecting a one of the virus scan requests from the queue.

15. The apparatus of claim 14, wherein the instructions for selecting is based on the priority order.

16. The apparatus of claim 14, wherein the instructions for selecting is based on the characteristic of the virus scan request.

17. The apparatus of claim 14, further comprising instructions for scanning the object of the selected virus scan request.

18. The apparatus of claim 14, wherein the instructions for placing the virus scan request on the queue in the priority order are further based on comparing the characteristic of the virus scan request with the characteristics of the virus scan requests previously placed on the queue.

19. The apparatus of claim 18, wherein the instructions for placing the virus scan request on the queue in the priority order are further based on a parameter indicating which of the compared characteristics is given higher priority.

20. The apparatus of claim 14, wherein the instructions for selecting are further based on comparing the characteristics of the virus scan requests placed in the queue.

21. The apparatus of claim 20, wherein the instructions for selecting are further based on comparing the characteristics of the virus scan requests placed in the queue with the characteristics of the previously selected virus scan requests whose objects are currently being scanned.

22. The apparatus of claim 20, wherein the instructions for selecting are further based on a parameter indicating which of the compared characteristics is given higher priority.

23. The apparatus of claim 13, wherein the instructions for checking to determine if scanning is necessary include determining when a virus scan status indicates the object is not known to be virus free.

24. The apparatus of claim 13, wherein the instructions for checking to determine if scanning is necessary include determining when the object of the virus scan request is in a directory not excluded from virus scanning.

25. A virus scanner comprising:
   a pre-processor thread that checks a virus scan request to determine if scanning an object of the request is necessary;
   a queue that receives the virus scan request in a priority order based on characteristics of the virus scan request, the characteristics including at least two of an identity of the user triggering the virus scan request, a type of the process accessing the object, a time stamp of when the virus scan request was received, and an indication of a network node accessing the object, wherein the virus scan request is prioritized based on at least two of the user identity being an administrator as compared to a regular user, the process type of being an operating system as compared to a user application, the time stamp being earlier than the time stamps of each scan request previously placed on the queue, and the indication being that the object is accessed from a server console as compared to a network client.

26. The virus scanner of claim 25, further comprising:
   a scanner thread that selects a one of the virus scan requests from the queue.

27. The virus scanner of claim 26, wherein the selection is based on the priority order.

28. The virus scanner of claim 26, wherein the selection is based on the characteristic of the virus scan request.

29. The virus scanner of claim 26, wherein the scanner thread further scans the object of the selected virus scan request.

30. The virus scanner of claim 25, wherein the priority order is further based on comparing the characteristic of the virus scan request with the characteristics of the virus scan requests previously placed on the queue.

31. The virus scanner of claim 30, wherein the priority order is further based on a parameter indicating which of the compared characteristics is given higher priority.

32. The virus scanner of claim 28, wherein the selection is further based on comparing the characteristics of the virus scan requests placed in the queue.

33. The virus scanner of claim 32, wherein the selection is further based on comparing the characteristics of the virus scan requests placed in the queue with the characteristics of the previously selected virus scan requests whose objects are currently being scanned.

34. The virus scanner of claim 33, wherein the selection is further based on a parameter indicating which of the compared characteristics is given higher priority.

35. The virus scanner of claim 25, wherein determining that scanning is necessary includes determining when a virus scan status indicates the object is not known to be virus free.

36. The virus scanner of claim 25, wherein determining that scanning is necessary includes determining when the object of the virus scan request is in a directory not excluded from virus scanning.

37. A computer system comprising:
   a processor coupled to a system bus;
   a memory coupled to the processor through the system bus;
   a machine-accessible medium coupled to the processor through the system bus;
   a virus scanning process executed from the machine-accessible medium by the processor, wherein the virus scanning process causes the processor to check a virus scanning request to determine if scanning an object of the request is necessary, and if so to further place the checked virus scan request on a queue in a priority order based on characteristics of the virus scan request, the characteristics including each of an identity of the user triggering the virus scan request, a type of the process accessing the object, a time stamp of when the virus scan request was received, and an indication of a network node accessing the object, wherein the virus scan request is prioritized based on the user identity being an administrator as compared to a regular user, the process type being an operating system as compared to a user application, the time stamp being earlier than the time stamps of each scan request previously placed on the queue, and the indication being that the object is accessed from a server console as compared to a network client.

38. The computer system of claim 37, wherein the virus scanning process further causes the processor to select a one of the virus scan requests from the queue.

39. The computer system of claim 38, wherein the selection is based on the priority order.

40. The computer system of claim 38, wherein the selection is based on the characteristics of the virus scan request.

41. The computer system of claim 38, wherein the virus scanning process further causes the processor to scan the object oil the selected virus scan request.

* * * * *

UNITED STATES PATENT AND TRADEMARK OFFICE
CERTIFICATE OF CORRECTION

PATENT NO. : 7,188,367 B1 Page 1 of 1
APPLICATION NO. : 09/823438
DATED : March 6, 2007
INVENTOR(S) : Edwards et al.

It is certified that error appears in the above-identified patent and that said Letters Patent is hereby corrected as shown below:

In the claims:
col. 14, line 9 replace "characteristics" with --characteristic--;
col. 14, line 12 replace "oil" with --of--.

Signed and Sealed this

Second Day of February, 2010

David J. Kappos
*Director of the United States Patent and Trademark Office*